(12) United States Patent
Kornilov

(10) Patent No.: US 12,118,602 B2
(45) Date of Patent: *Oct. 15, 2024

(54) RECOMMENDATION SYSTEM, METHOD AND COMPUTER PROGRAM PRODUCT BASED ON A USER'S PHYSICAL FEATURES

(71) Applicant: Ditto Technologies, Inc., Oakland, CA (US)

(72) Inventor: Dmitry Kornilov, Menlo Park, CA (US)

(73) Assignee: DITTO TECHNOLOGIES, INC., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,490

(22) Filed: Sep. 10, 2021

(65) Prior Publication Data

US 2021/0406987 A1 Dec. 30, 2021

Related U.S. Application Data

(63) Continuation of application No. 15/826,533, filed on Nov. 29, 2017, now Pat. No. 11,157,985.

(51) Int. Cl.
*G06Q 30/0601* (2023.01)
*G06Q 30/0282* (2023.01)
(Continued)

(52) U.S. Cl.
CPC ..... *G06Q 30/0631* (2013.01); *G06Q 30/0282* (2013.01); *G06T 17/20* (2013.01);
(Continued)

(58) Field of Classification Search
CPC ....................................... G06Q 30/0601–0645
(Continued)

(56) References Cited

U.S. PATENT DOCUMENTS 7,958,066 B2 * 6/2011 Pinckney .............. G06N 20/00
707/706
9,058,765 B1 6/2015 Mallick
(Continued)

FOREIGN PATENT DOCUMENTS

CN   105190673 A   12/2015
CN   105340286 A   2/2016
(Continued)

OTHER PUBLICATIONS

Hu, G. (2015). Face analysis using 3D morphable models (Order No. 10088337). Available from ProQuest Dissertations and Theses Professional. (1784058054). Retrieved from https://dialog.proquest.com/professional/docview/1784058054?accountid=131444 (Year: 2015).*

(Continued)

*Primary Examiner* — Jeffrey A. Smith
*Assistant Examiner* — Ashley D Preston
(74) *Attorney, Agent, or Firm* — H&I PARTNERS; Chai Im; C. Andrew Im

(57) ABSTRACT

Embodiments of the present disclosure provide a recommendation system based on a user's physical/biometric features. In various embodiments, a system includes a processor configured to determine a physical characteristic of a user based at least in part on an image of the user. The processor is further configured to determine a correlation between the physical characteristic and a product, and generate a product recommendation based at least in part on the determined correlation.

19 Claims, 12 Drawing Sheets

(51) Int. Cl.
*G06T 17/20* (2006.01)
*G06V 40/16* (2022.01)

(52) U.S. Cl.
CPC .......... *G06V 40/165* (2022.01); *G06V 40/171* (2022.01); *G06V 40/172* (2022.01)

(58) Field of Classification Search
USPC ................................................ 705/26.1–27.2
See application file for complete search history.

(56) References Cited

U.S. PATENT DOCUMENTS

| | | | |
|---|---|---|---|
| 9,111,134 B1* | 8/2015 | Rogers | G06V 40/176 |
| 11,157,985 B2* | 10/2021 | Kornilov | G06V 40/165 |
| 2003/0065636 A1* | 4/2003 | Peyrelevade | A45D 44/005 |
| | | | 706/62 |
| 2007/0058858 A1 | 3/2007 | Harville | |
| 2008/0201329 A1 | 8/2008 | Yiling | |
| 2013/0088490 A1* | 4/2013 | Rasmussen | G06T 17/00 |
| | | | 345/421 |
| 2014/0253707 A1* | 9/2014 | Gangadhar | G02C 13/003 |
| | | | 382/100 |
| 2014/0258016 A1 | 9/2014 | Hale | |
| 2015/0055085 A1 | 2/2015 | Fonte | |
| 2015/0310262 A1 | 10/2015 | Do | |
| 2016/0127787 A1 | 5/2016 | Khalsa | |
| 2016/0210602 A1* | 7/2016 | Siddique | G06Q 20/321 |
| 2017/0286534 A1 | 10/2017 | Arora | |
| 2017/0337611 A1 | 11/2017 | Hsiao | |
| 2019/0254408 A1* | 8/2019 | Kishi | G06T 11/60 |
| 2020/0193503 A1* | 6/2020 | Mathiaszyk | G06Q 30/0623 |

FOREIGN PATENT DOCUMENTS

| | | |
|---|---|---|
| CN | 105898090 A | 8/2016 |
| CN | 106354768 A | 1/2017 |
| CN | 106651542 | 5/2017 |
| CN | 106651542 A | 5/2017 |
| CN | 107123027 A | 9/2017 |
| CN | 106354768 | 3/2020 |
| CN | 107123027 | 6/2021 |
| JP | 2003030494 | 1/2003 |
| JP | 2009134558 | 6/2009 |
| JP | 2011192189 | 9/2011 |
| JP | 2017037650 A | 2/2017 |
| WO | 2008108760 | 9/2008 |
| WO | 2015027196 | 2/2015 |
| WO | 2017026852 | 2/2017 |
| WO | 2017029488 | 2/2017 |

OTHER PUBLICATIONS

Lee, A. (2019). Sustaining prototypes with 3-D virtual garments. WWD,, 18. Retrieved from https://dialog.proquest.com/professional/docview/2319140164 ?accountid=161862 (Year: 2019).

* cited by examiner

100

200

300

400

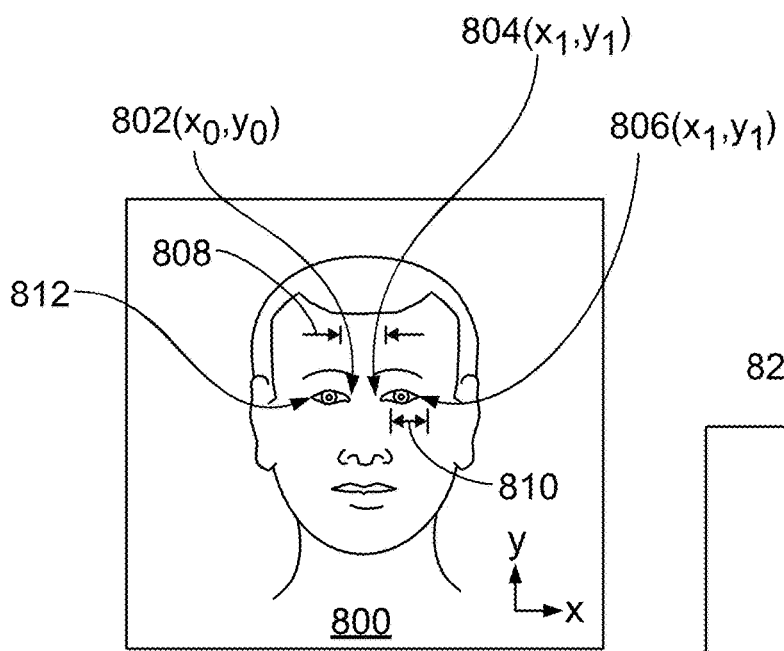
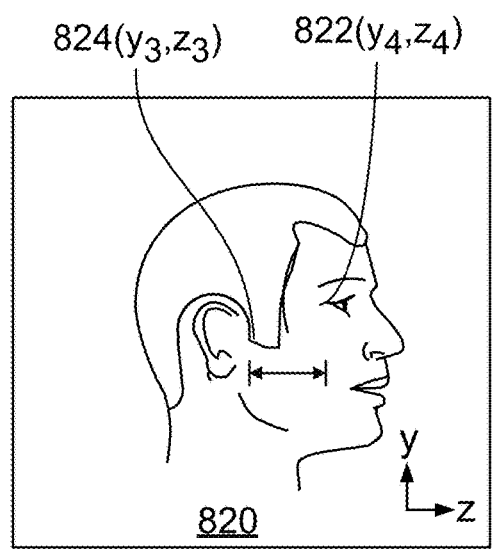
FIG. 8A
FIG. 8B
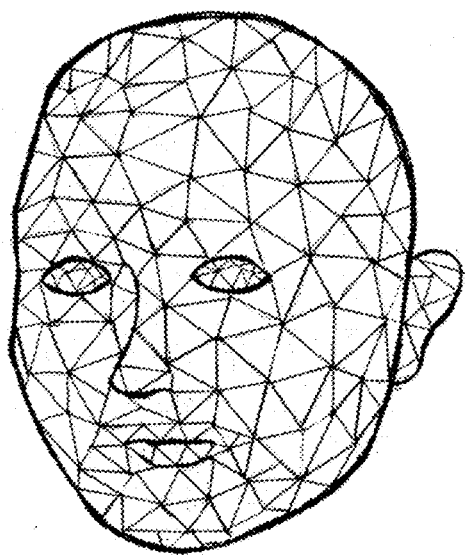
FIG. 9

1000

1200

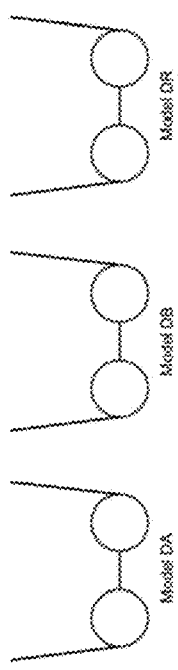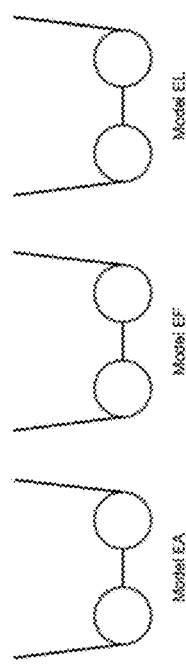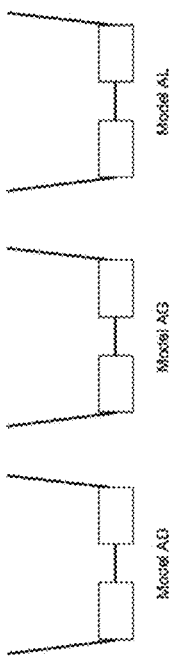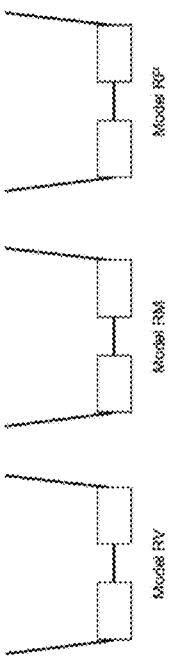
FIG. 13B
1330
FIG. 13C
1350
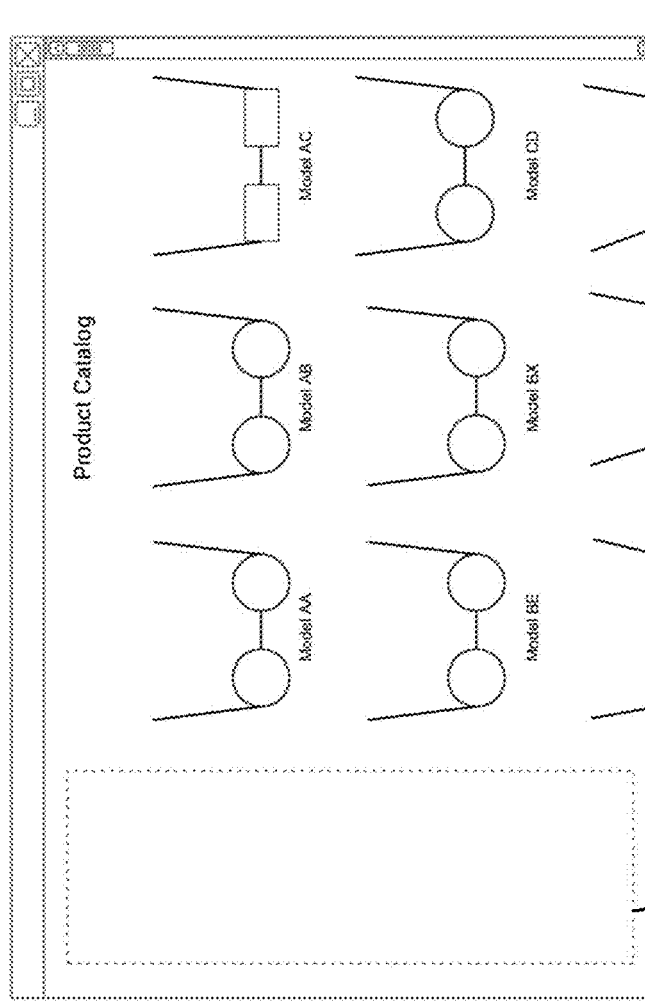
FIG. 13A
1300

1400

1450

1500

1550

RECOMMENDATION SYSTEM, METHOD AND COMPUTER PROGRAM PRODUCT BASED ON A USER'S PHYSICAL FEATURES

CROSS REFERENCE TO OTHER APPLICATIONS

This application is a continuation of U.S. patent application Ser. No. 15/826,533 entitled RECOMMENDATION SYSTEM, METHOD AND COMPUTER PROGRAM PRODUCT BASED ON A USER'S PHYSICAL FEATURES filed Nov. 29, 2017 which is incorporated herein by reference for all purposes.

BACKGROUND OF THE INVENTION

Someone interested in buying apparel and accessories such as glasses usually needs to visit a store in person and try on the products to see if they are a good fit. Clothing and accessories typically have both a functional and aesthetic purpose, which may affect the selection process. It may take hours of browsing and trying on products, most of the time without prior knowledge of the suitability of a product. Personal stylists may help with the decision process by suggesting products. However, personal stylists are limited by their own biases and familiarity with a relatively small field of available inventory. Conventional product recommendation algorithms are typically simple and make suggestions based on a rudimentary assessment of user's browsing history.

BRIEF DESCRIPTION OF THE DRAWINGS

Various embodiments of the invention are disclosed in the following detailed description and the accompanying drawings.

FIG. 8A shows an example of reference points obtained from a set of images of a user's face.

FIG. 8B shows an example of reference points obtained from a set of images of a user's face.

FIG. 9 is a diagram showing an example of a visualization of a predetermined 3D face in 3D space.

FIG. 13A is an example graphical user interface (GUI) of a product catalog for browsing an inventory.

FIG. 13B is an example GUI showing products displayed in response to user interaction with the GUI of FIG. 13A.

FIG. 13C is an example GUI showing products displayed in response to user interaction with the GUI of FIG. 13A.

DETAILED DESCRIPTION

Figure 1:
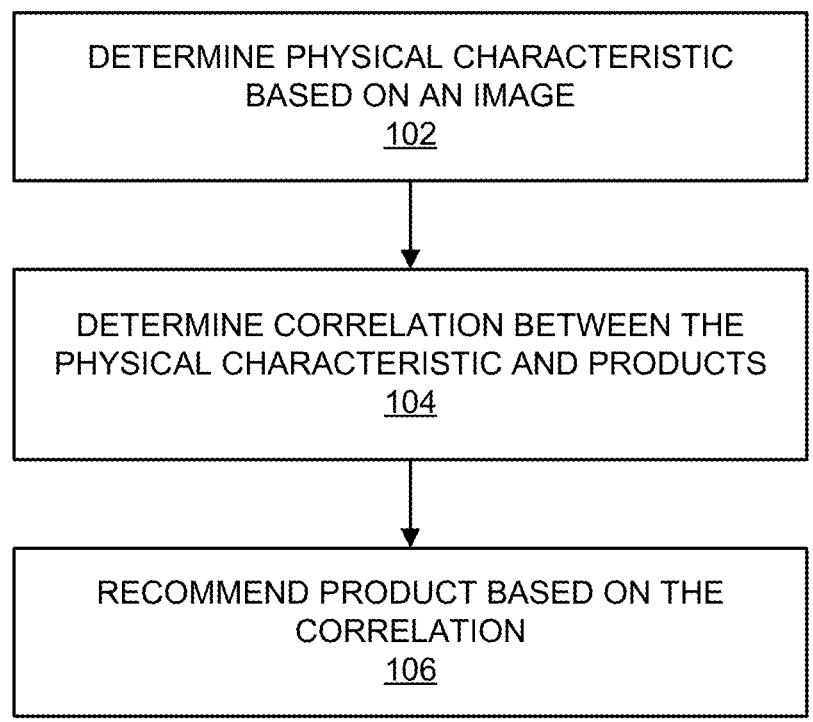
FIG. 1 is a flow chart illustrating an embodiment of a process for recommending a product based on images of a user.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a recommendation system based on a user's physical features are disclosed. In various embodiments, physical characteristics (sometimes referred to as "biometric characteristics) are determined and used to make recommendations of products suitable for the user. The physical characteristics may describe the 3D surface of a user's face including facial structure or proportion, face shape, eye color and shape, hair color, skin color, skin pattern, and the like. In various embodiments, a physical characteristic of a user is determined based at least in part on an image of the user. A correlation between the physical characteristic and a product is determined, and a product recommendation is generated based at least in part on the determined correlation. The images of the user may be still images or frames of video of a user's frontal profile, side profile, or something in between as more fully described below.

The correlation between the physical characteristic and the product may be determined based on similarities between users (such as similar 3D surface of the face) or fit of the product to the user. Unlike conventional stylists or fit advisors that provide recommendations based on user-reported attributes or properties of a 2D image, in various embodiments, recommendations are made based on systematically determined 3D physical characteristics such as features of the 3D surface of a user's face.

FIG. 1 is a flow chart illustrating an embodiment of a process for recommending a product based on images of a user. Process 100 may be at least in part implemented on one or more components of system 200 of FIG. 2. In some embodiments, process 200 is performed by recommendation engine 314 of FIG. 3.

The process determines physical characteristics based on an image (102). The physical characteristics refer to attributes of a subject of the image. For example, for an image of a user, physical characteristics include facial features such as 3D surface of the face, facial structure or proportion, face shape, eye color, eye shape, hair color, skin color, skin pattern, and the like. Physical characteristics such as distance between eyes, distance from nose bridge to nose tip, etc. can be measured by extracting reference points obtained from a set of images as more fully described with respect to FIGS. 8A and 8B. In various embodiments, the image include other sensor data such as depth sensors that may facilitate determination of the physical characteristics.

Figure 2:
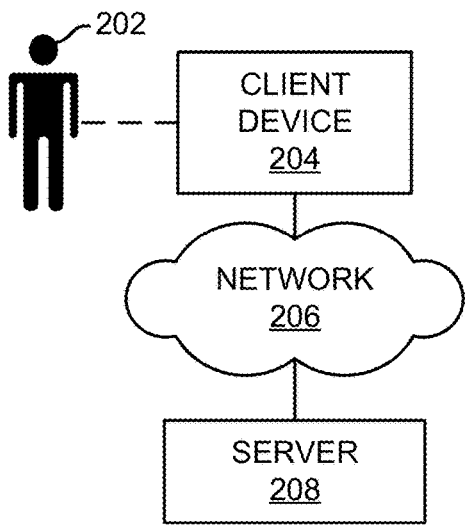
FIG. 2 is a block diagram illustrating an embodiment of a system for making recommendations based on a user's physical features.

Images may be captured by a camera such as a camera associated with client device 204 of FIG. 2. Other sensor data may be captured by various sensors such as depth sensors. In some embodiments, a single substantially frontal image of the user is sufficient for making a product recommendation. In some embodiments, a plurality of images of the user such as images of the user's head taken from different angles, frames forming a video, etc. are used to determine physical characteristics as more fully described herein. A user may be provided with instructions of how to take images. For example, a user may be instructed to position herself in from of the camera, and turn her head as the camera captures video frames. In some embodiments, the user is instructed to look left and then look right. In some embodiments, the instructions may be embodied in a demo video clip or animation. The number of video frames captured can vary. The camera can be instructed by a processor to capture the user's head with a continuous video or snapshots (for example, series of images with a delay between captures). In some embodiments, the camera captures images of the user's head in a continuous capture mode, where the frame rate can be lower than capturing a video. The processor can be local or remote, for example on a server. Captured images can be used to determine physical characteristics of a subject and/or determine a 3D model of the user's face on which a 3D model of a selected glasses frame is to be placed/fitted, as will be described in further detail below.

In some embodiments, physical characteristics are determined based on an intermediate model of the user's head constructed from the images. The intermediate model may be a 3D model of the head described by vectors and polygons encoding information about facial features and head proportions of the 3D surface of the face, as more fully described herein. Physical characteristics may be extracted from the 3D model. In some embodiments, the 3D model is generated by 3D model engine 306 shown in FIG. 3.

The process determines a correlation between the physical characteristics and a product (104). A correlation may be a relationship between users such as similarity of facial features or similarity in the 3D surface of the face. A correlation may be a relationship between a user and a product such as the degree of fit of the product to the user. Fit, as used herein, refers to functional fit such as how well a pair of glasses fits a user's face, which may be indicated by factors such as comfort, the quality of vision provided by the glasses to the user, etc. Fit, as used herein, also refers to aesthetic fit such as how nice a pair of glasses looks on a user's face, which may be indicated by scoring of proportion of frame to the eye and other facial proportions.

The process recommends a product (106). A recommendation may be generated based at least in part on the determined correlation. In various embodiments, the recommendation is determined using deep neural networks, content-based filtering, collaborative filtering, or a combination thereof.

Content-based filtering refers to searching products similar to other products. Using the example of glasses, similarity may be assessed based on attributes such as shape, color, material (plastic or wire frame), price, suitability for lens prescription, etc. Searching by similarity of products to each other allows glasses to be found that are similar to other glasses because of shared or similar attributes. A user who has an interest in one product may be interested in a similar product.

Collaborative filtering refers to finding products based on purchase history. Suppose a first user has purchased glasses A, B, and C and a second user has purchased glasses B, C, and D. The purchase history of the first user and the second user are similar to each other because they both purchased glasses B and C. In some embodiments, collaborative filtering of this data indicates that glasses A can be recommended to the second user, and glasses D can be recommended to the first user because the first and second users have similar taste.

In various embodiments, the result of content-based filtering or collaborative filtering may be adjusted based on other factors such as user-indicated preferences. Suppose frames of a contrasting color to a user's skin tone are recommended by default, but the user prefers frames of a color that blends with the user's skin tone. Recommendations may be refined according to the user's indicated preference for frames that blend with the skin tone. With the user preference information, a recommendation system can be updated to recommend products more aligned with the user's preferences.

In one aspect, preferences may change over time. For example, a user's preferences may change as styles change or tastes change. The recommendation engine may adapt to the changes by learning and adapting to changes.

In some embodiments, the product recommendation includes an explanation for why the recommendation was made. In contrast to conventional techniques in which recommendation systems present a user with a recommendation without explanation for why a product was selected, the recommendation made here may include facts and explanations for how and why the system made the selections. The recommendation explanation may be made according to the process shown in FIG. 10. The correlation and recommendation process is further described herein with respect to the system shown in FIG. 4.

FIG. 2 is a block diagram illustrating an embodiment of a system for making recommendations based on a user's physical features. In this example, system 200 includes client device 204, network 206, and server 208. The client device 204 is coupled to the server 208 via network 206. Network 206 may include high speed data networks and/or telecommunications networks. A user 202 may interact with the client device to provide information useful for making recommendations and receive recommendations according to the methods further described herein.

Client device 204 is configured to provide a user interface for user 202. For example, client device 204 may receive input or observe user interaction by user 202 with the client device. Based on at least some of the information collected by the client device, a recommendation is output to the user. In some embodiments, the recommendation is made in cooperation with server 208 as further described herein.

In various embodiments, the client device includes an input component such as a camera, depth sensor, other sensor, or a combination of multiple sensors. A camera may be configured to observe and/or capture images of the user from which physical characteristics may be determined. The user may be instructed to operate the camera or pose for the camera as further described herein. The information collected by the input components may be used and/or stored for making a recommendation.

Server 108 is configured to determine physical characteristics from input images, determine a correlation between the physical characteristics and a product, and recommend a product. The server may make the correlation and recommendation based on a variety of collected data including images of a user, images of product, user browsing habits, user profile, and the like as more fully described herein. Making a recommendation based on a user's physical characteristics has many applications. Example applications of making a recommendation based on user's physical characteristics include virtual try-on of facial accessories such as eyewear, makeup, jewelry, etc.

Figure 3:
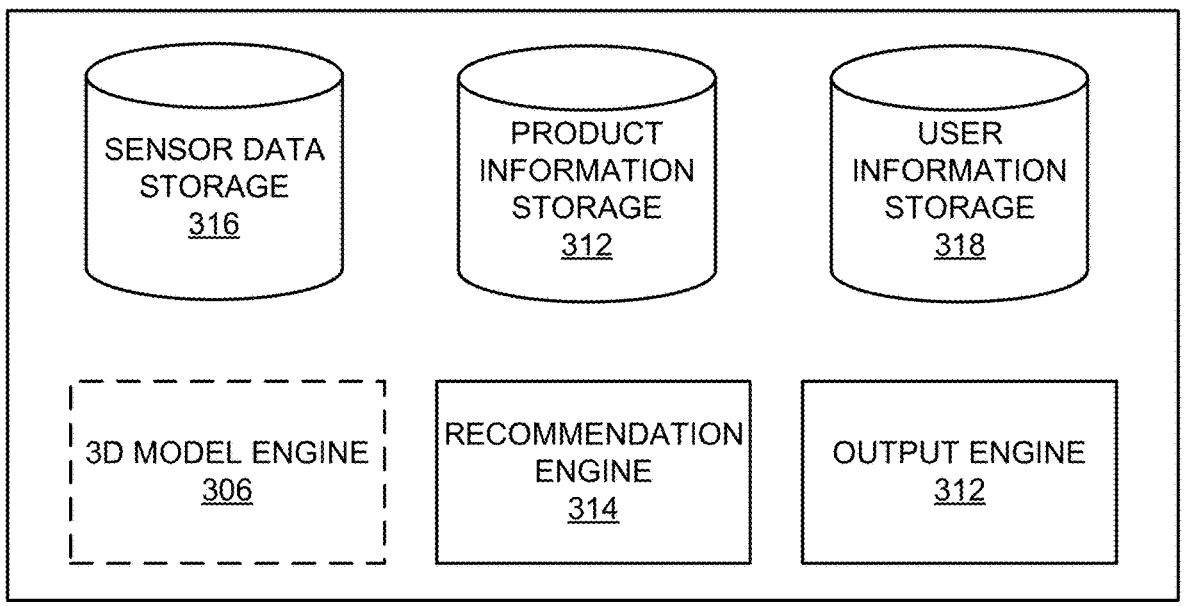
FIG. 3 is a block diagram illustrating an example of a system for making recommendations based on a user's physical features.

FIG. 3 is a block diagram illustrating an example of a system for making recommendations based on a user's physical features. System 300 may be included in server 208 of FIG. 2. In this example, system 300 includes sensor data storage 316, product information storage 312, user information storage 318, recommendation engine 314, and output engine 312.

Sensor data storage 316 is configured to store sensor data such as image/depth data, still images, frames of a video, and associated data from various sensors. The sensor data may be associated with various users. In some embodiments, the image storage stores images that have been recorded or otherwise captured by a camera. The subject of the images may be of a subject such as a (human) user. The images may be stored in association with a particular user or group of users such as associated with a user profile. The images stored in sensor data storage 316 may be retrieved and processed according to the methods described herein to determine physical characteristics of the subject of the images.

Product information storage 312 is configured to store information about inventory. The inventor may include a set of products available to a user such as glasses frames available for purchase. For example, characteristics of a product such as color, shape, size, and the like may be stored. A digital representation such as 3D coordinates of vertices representing a 3D model of the product may be stored. Each product may be stored with one or more pre-defined label. A label is a description of the type or characteristic of the product and may allow the product to be grouped with other products, as more fully described herein. Example labels for glasses frames include physical attribute properties such as "plastic" or "metal," or style/human perception-based classification such as "academic," "nerdy," and "sporty."

In various embodiments, product performance information may be stored. The performance may be associated with popularity of a product or group of products with a particular user or group of users.

User information storage 318 is configured to store information associated with particular users. For example, a user profile describing a user such as the subject's physical characteristics, past purchases, preferences, and history of interactions with a user interface (e.g., Web browsing) may be stored.

Recommendation engine 314 is configured to make recommendations based on at least some of the information stored by sensor data storage 316, product information storage 312, and/or user information storage 314. In various embodiments, the recommendation engine is configured to determine physical characteristics of a user based at least in part on an image of the user such as image(s) of the user's face or head. The images may be extracted in real time from a client device and/or extracted from sensor data storage 316. In some embodiments, physical characteristics are determined directly from images. In some embodiments, physical characteristics are determined from a 3D model or a user's head, which 3D model is derived from a set of images a more fully described herein. Based at least in part on the determined physical characteristics, a product recommendation is generated. The recommendation engine may be configured to make a recommendation based on several factors including similarities between physical characteristics of different users and customer preferences.

In various embodiments, the recommendation engine makes a recommendation based on similarities between physical characteristics of different users. For example, if one user purchases or takes an interest in a particular product, then the same product can be recommended to another user having a similar physical characteristic.

In various embodiments, the recommendation engine makes a recommendation by adapting to customer preferences. The adaptation may be made in real time. For example, as a user scrolls down a web page or progresses from one web page to another web page, recommendations displayed to the user may be updated. When a user browses a web page, information about the user such as reactions to products may be collected. In some embodiments, this information may be used immediately to update content that the user is expected to access later such as a portion of a web page not yet visible to the user. In some embodiments, the information is collected about the user is stored for later use such as associated with a user profile. Examples of graphical user interface (GUI) updates in response to customer preferences are shown in FIGS. 13A-13C, 14A, 14B, 15A, and 15B.

In some embodiments, a group of styles (sometimes called "style cluster") is recommended to the user. In response to user feedback on the group of styles, products within the group of styles may be displayed. For example, a recommendation of academic styles and sporty styles may be made to the user. In various embodiments, categories are fixed for a specific group of products (e.g., per ecommerce site). Categories can be created in advance by using product properties, e.g., material: metal/plastic, style: rectangle/oval, color, size, etc. The product properties form a multidimensional space in which a clustering technique (for example K-means clustering) is applied to find clusters of products. Style experts then assign labels (which, in various embodiments, are intelligible to humans) to each cluster: "academic," "sporty," "nerdy," etc. When clusters are presented to a customer, a recommendation engine (e.g., recommendation engine 314 of FIG. 3) picks an N-sample of the most recommended glasses (for example N=30), searches which clusters contain these N-sample, and orders clusters based on a score. The score can be computed, for example, by calculating the number of glasses from the N-sample in each cluster, calculated based on a weighted sum, and the like.

If the user selects sporty styles, then products in the group "sporty styles" suited for the user (e.g., as determined by the methods more fully described herein) are displayed. The label of a style cluster (e.g., "academic") may be made by a human or computer. In one aspect, user experience may be enhanced by presenting an aggregated sub-set of products instead of individual products by allowing the user to choose to focus on a group of products without overwhelming the user with too many individual products.

Figure 12:
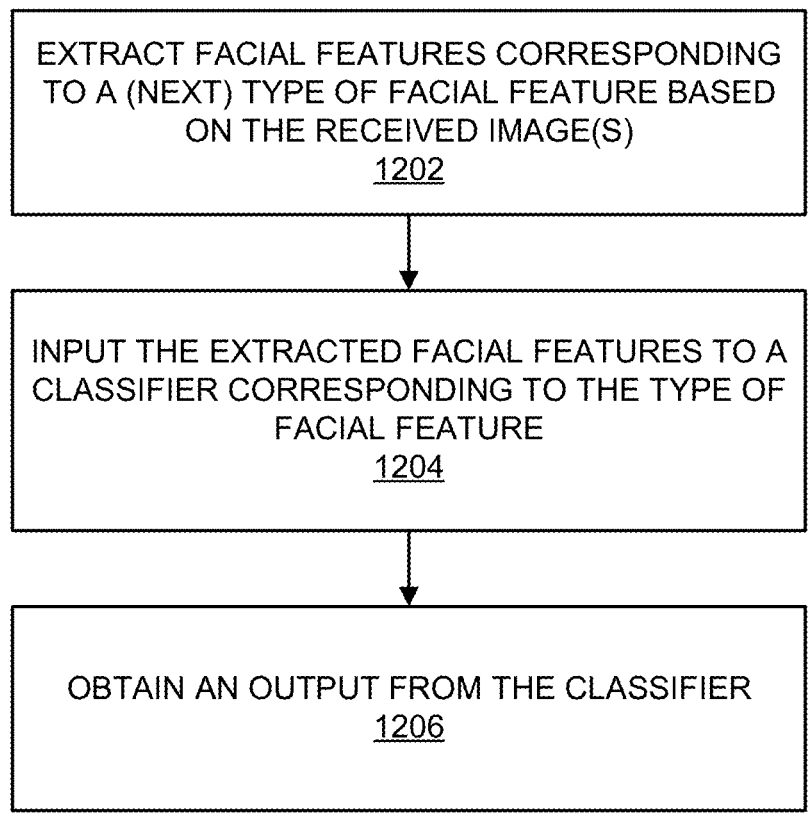
FIG. 12 is a flow chart illustrating an embodiment of a process for determining facial feature properties using a classifier.

The recommendation engine may be trained to improve determination of recommendations over time. For example, a good recommendation is one that a user tends to follow. Over time, the recommendation engine may be trained to make recommendations that a user is more likely to follow. An example process for training the recommendation engine is shown in FIG. 12.

Output engine 312 is configured to provide output such as recommendations. The output engine may include explanations for why particular recommendations are made such as the factors that caused a particular recommendation to be made, as further described herein. The output engine 312 may provide output on a variety of media such as a user interface of a client device (e.g., client device 204 of FIG. 2).

In some embodiments, system 300 includes a 3D model engine 306. The morphable model engine 306 is configured to generate a three-dimensional (3D) model from input images. In various embodiments, the 3D model engine is configured to generate a 3D model of a user's head from a set of images. In various embodiments, the 3D model engine is configured to generate a 3D model of a product from product description or images. The morphable model may be used to derive physical characteristics of a user as more fully described herein.

The 3D model (sometimes called "morphable model") may be generated according to various techniques. For example, an input image of a user's face to be modeled is received and a set of parameter values to input into a statistical model to correspond to an input image is generated by evaluating candidate parameter values using a cost function that is determined based at least in part on optical flow. Additional examples of 3D model generation is described with respect to FIGS. 5-7.

In various embodiments, subsets of PCA components define various physical characteristics. For example, a subset of PCA components define facial shape, and another subset (which may or may not overlap with the first subset) define facial proportions.

Figure 4:
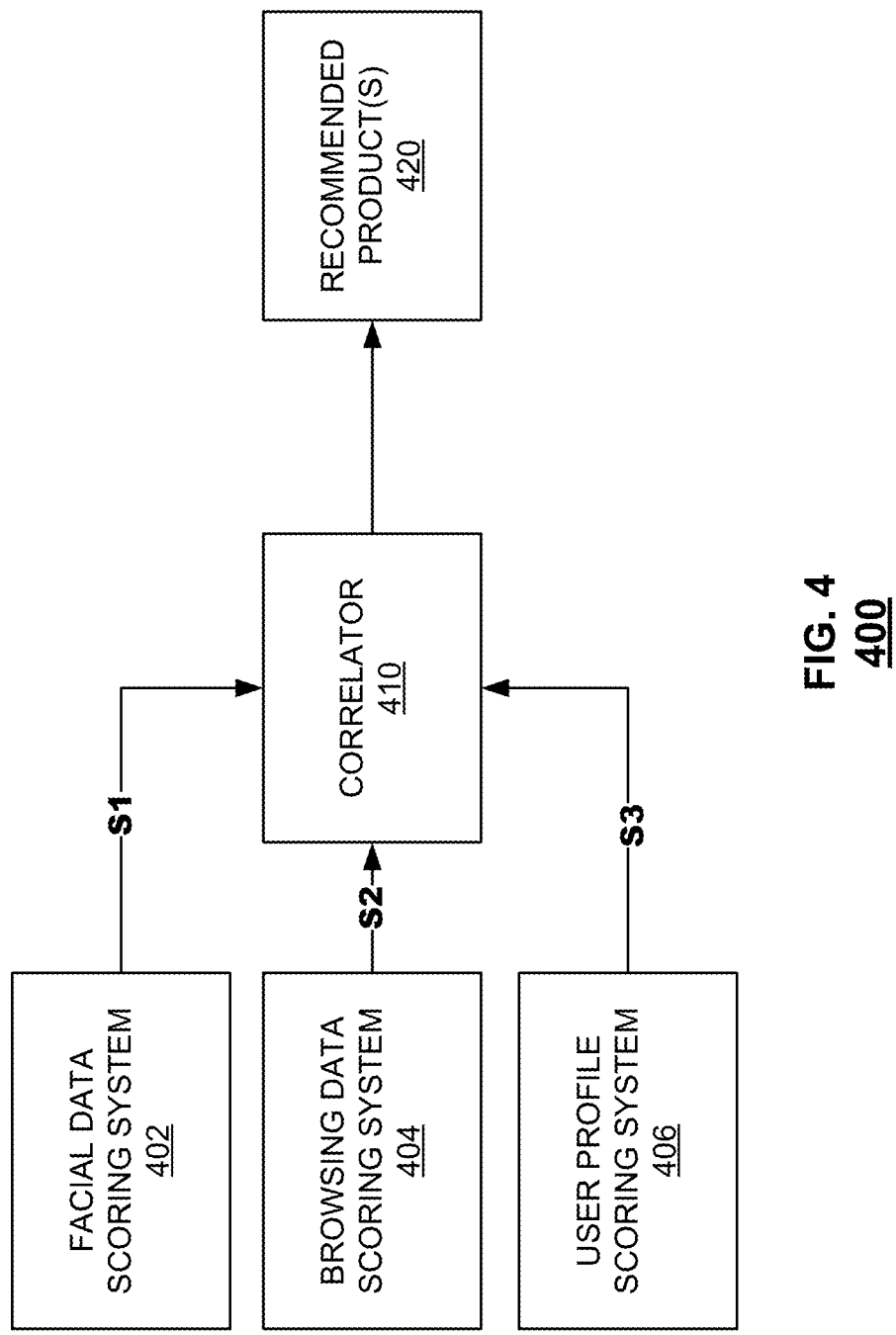
FIG. 4 is a block diagram illustrating an embodiment of a recommendation engine.

FIG. 4 is a block diagram illustrating an embodiment of a recommendation engine. In this example, recommendation engine 400 includes facial data scoring system 402, browsing data scoring system 404, user profile scoring system 406, and correlator 410.

Facial data scoring system 402 is configured to provide a score based on physical characteristics of users such as facial features. The score may be used to determine a recommendation for a user. As more fully discussed herein, facial features include facial structure or proportion, face shape, iris color, hair color, skin color, and skin pattern. The recommendation may be a score, S1.

Browsing data scoring system 404 is configured to provide a recommendation based on user behavior such as interaction with a website, purchase history, browsing behavior, and the like. For example, when a user lingers on a particular product, the behavior may indicate interest in that product. This interest may be associated with user and products similar to that product may be recommended to the user.

User profile scoring system 406 is configured to provide a recommendation based on customer attributes that are not physical characteristics. Example attributes include demographics such as location, income, education, age, gender, and the like. Non-biometric attributes may affect a recommendation. For example, a user based in a sunny state is more likely to want sunglasses, and suitable products may be recommended the user.

Correlator 410 is configured to determine correlations between features of a user (such as facial features, user history) and products. The correlator may determine correlations based on product properties such as price, color, etc. The correlator may determine correlations based on one or more of the following factors: similarity of faces (content-based filtering), interaction with a site and/or purchase history in brick-and-mortar stores (collaborative filtering), etc. The correlator may combine the scores output by each of the scoring systems 402-406. In some embodiments, the scores are weighted when they are combined. The weighting of the system may be adjusted dynamically or predefined. For example, a user may wish to emphasize style, face-flattering, fit, etc. The weights assigned to scores S1, S2, and S3 may be adjusted accordingly.

In some embodiments, facial data (score S1) is more heavily weighted than the other scores because facial data may be considered more important for making a recommendation. For example, 50% is assigned to facial data and the remaining 50% is distributed between the user data and user profile data.

The weighting of facial data may be adjusted. For example, if a user disagrees with a recommendation, then weight accorded to the facial data is lowered. In some embodiments, weights are dynamically adjusted in response to user interaction with a webpage such as after a user clicks on a product (which may indicate interest in that product). In some embodiments, weights are dynamically adjusted in response to a user session. For example, information collected during a user's browsing session (such as while the user visits the website for 15 minutes) is processed to adjust weights based on the user's interaction with the website. A user lingering on a portion of the webpage displaying certain products may indicate interest in those products.

In some embodiments, correlation is performed using a 3D model of a user's face and a 3D model of a product. For each of the face and the product, the 3D morphable techniques described herein are applied to extract the 3D models including PCA components of each of the face and the product. The vertices and PCA components of each of the face and product and purchase history are provided to a correlator to obtain a recommendation for a product.

In various embodiments, the recommendation engine is configured to output a list of recommended products. In some embodiments, the list is a ranked list of products, where the products may be displayed in ranked order. The recommendation engine may be configured to apply one or more rules to further filter recommendations. For example, the recommendation engine may be configured to display certain brands, products within a price range, and the like.

In some embodiments, deep neural networks may be used to find correlations between a user's face and purchases. Data about user faces, purchase history, and product information (such as product characteristics) is stored. The deep neural networks may be trained to determine combinations (relationships, correlations) of faces and product information and purchase history. In other words, a data model (deep neural network) may be constructed to describe which faces will purchase which products. Using the data model, recommendations may be made for users without a purchase history or with a short purchase history. For example, a known face similar to the new user's face is identified and products are recommended for the new user's face based on the known face purchase history. Products may be recommended based on historical user interaction with a website.

Figure 5:
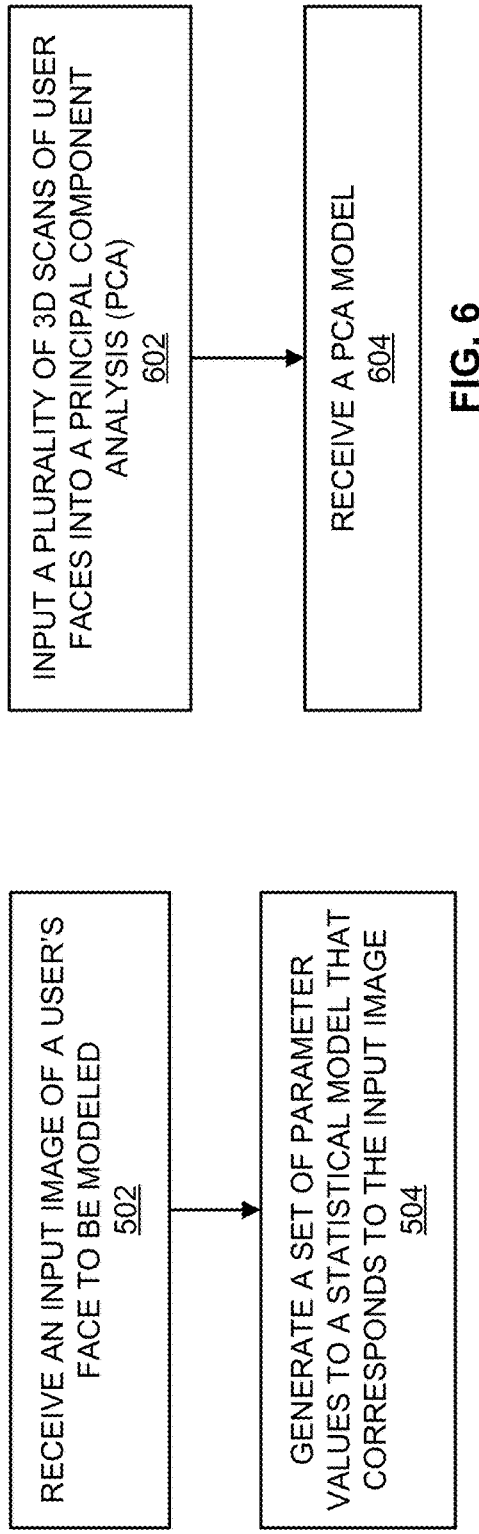
FIG. 5 is a flow diagram showing an embodiment of a process for 3D modeling of a user's face.

FIG. 5 is a flow diagram showing an embodiment of a process for 3D modeling of a user's face. Process 500 may be at least in part implemented on one or more components of system 200 of FIG. 2. In some embodiments, process 500 is performed by 3D model engine 306 of FIG. 3. In some embodiments, at least a portion of the process of FIG. 5 is included in 102 of FIG. 1.

At 502, an input image of a user's face to be modeled is received. The input image of a user's face comprises a captured or recorded image of the user's face. In various embodiments, the input image of the user's face may comprise a front profile of the user's face, a side profile of the user's face, or a profile of the user's face at an angle in between the front profile and the side profile.

At 504, a set of parameter values to a statistical model that corresponds to the input image is generated by evaluating candidate parameter values using a cost function that is determined based at least in part on optical flow. In various embodiments, parameter values that are to be input into a PCA model comprising one or more shape components and one or more texture components to generate a 3D model of a face that (e.g., optimally or within a given tolerance) matches the user's face in the input image are determined. In some embodiments, in addition to the parameter values to be input into the PCA model, additional parameters associated with a camera focal length, camera rotation (e.g., in 3D space), and camera translation (e.g., in 3D space) are also to be determined. In various embodiments, the parameter values that are to be input into a PCA model and also camera parameter values are determined by iterating through various candidate sets of parameter values, generating 3D models of faces using the candidate sets of parameter values, projecting the generated 3D models of faces onto 2D surfaces to generate candidate synthetic images, and computing costs between each candidate synthetic image and the input image. In various embodiments, the cost between each candidate synthetic image and the input image is determined based on an optical flow from the candidate synthetic image to the input image.

Figure 6:
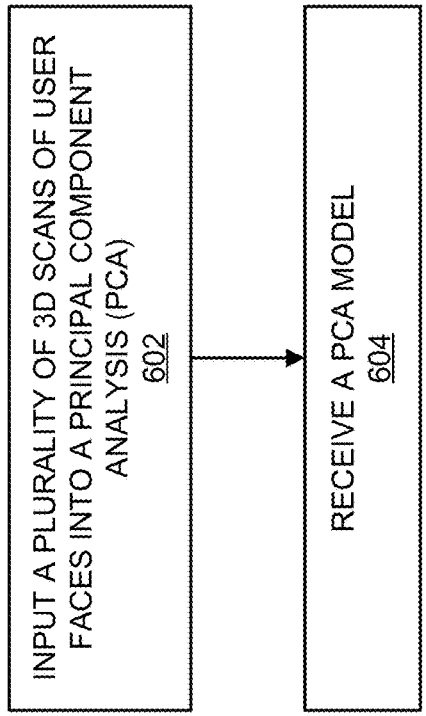
FIG. 6 is a flow diagram showing an embodiment of a process for 3D modeling of a user's face.

FIG. 6 is a flow diagram showing an embodiment of a process for 3D modeling of a user's face. Process 600 may be at least in part implemented on one or more components of system 200 of FIG. 2. In some embodiments, process 600 is performed by 3D model engine 306 of FIG. 3. In some embodiments, at least a portion of the process of FIG. 6 is included in 102 of FIG. 1.

At 602, a plurality of 3D scans of users' faces is input into a Principal Component Analysis (PCA). PCA is applied to a large number (e.g., 200) of 3D scans of various users' faces.

At 604, a PCA model that comprises a plurality of components and a plurality of parameter value ranges corresponding to respective ones of the plurality of components is received from the PCA. PCA is a statistical procedure that identifies a set of linearly uncorrelated variables, referred to as "principal components," among input data. Each principal component represents a variance among the input data and is orthogonal to each of the other principal components that are determined from the same input data. In various embodiments, the obtained PCA model comprises a set of shape components and a set of texture components that respectively describe variances in the shape and texture among the input 3D scans of users' faces. The combination of the shape and texture components forms a 3D morphable model of a face. In some embodiments, each shape component is a vector of 40,000 (x, y, z) coordinates that describe 40,000 vertices of a 3D model of a user's face. In some embodiments, each texture component is a vector of 40,000 (r, g, b) values that describe the color of 40,000 corresponding vertices of a 3D model of a user's face. In addition to the set of shape components and the set of texture components, the PCA also outputs a range of values corresponding to each coefficient associated with each shape or texture component. One set of the shape and texture coefficients generates a specific face using the 3D morphable model while a second set of the shape and texture coefficients generates another specific face, which is why the model is referred to as being "morphable."

In various embodiments, a different 3D model of a face may be generated by assigning different values to the coefficients associated with each shape or texture component, combining the scaled shape components into a combined face shape, combining the scaled texture components into a combined face texture, and then combining the combined face shape with the combined face texture. The shape coefficients and texture coefficients corresponding to the shape and texture components of a PCA are included in the set of parameter values to be determined in various embodiments as described herein. In some embodiments, the PCA model is configured to include 20 shape components and 20 texture components. As such, 20 shape coefficients and 20 texture coefficients are included in the set of parameter values to be determined in some embodiments described herein.

Figure 7:
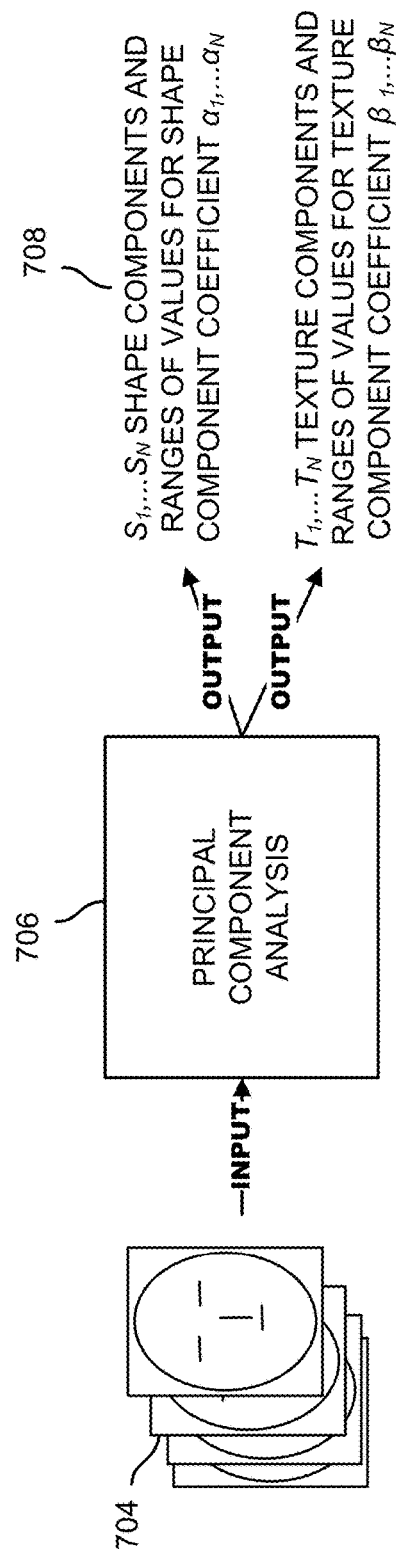
FIG. 7 is a diagram showing an example of input into and output from a Principal Component Analysis for generating a 3D morphable model of a user's face.

FIG. 7 is a diagram showing an example of input into and output from a Principal Component Analysis for generating a 3D morphable model of a user's face. As described in process 600 of FIG. 6, various 3D scans of different users' faces 704 are input to Principal Component Analysis 706, which may be implemented using one or more software and hardware. Principal Component Analysis 706 then produces outputs 708. Outputs 708 include a set of shape components $S_1, \ldots, S_N$, where $S_i=(x_1, y_1, z_1, \ldots, x_n, y_n, z_n)$, where x, y, and z are the 3D locations of a vertex. Outputs 708 further include a set of texture components $T_1, \ldots, T_N$, where $T_i=(r_1, g_1, b_1, \ldots, r_n, g_n, b_n)$, where collectively r, g, and b is the color of a vertex. In some embodiments, N and n are both values that are configurable. In some embodiments, N=20 and n=40,000. Outputs 708 further includes a range of values for each shape coefficient, $\alpha_1, \ldots, \alpha_N$, corresponding to a respective shape component and a range of values for each texture coefficient, $\beta_1, \ldots, \beta_N$, corresponding to a respective texture component.

In some embodiments, an average shape, $S_{avg}$, (e.g., a vector with 3D coordinates that describe the 3D locations of 40,000 vertices) is generated from various 3D scans of different users' faces 704 separately from Principal Component Analysis 706. In some embodiments, an average texture, $T_{avg}$, (e.g., a vector with r, g, and b values that describe the color of 40,000 vertices) is generated from various 3D scans of different users' faces separately from Principal Component Analysis 706.

In various embodiments, combining the shape and texture components of outputs 208 with the average shape component and the average texture component, a new 3D face shape and a new 3D face texture may be generated based on the following formulae:

$$S_{new} = S_{avg} + \Sigma_i \alpha_i S_i \quad (1)$$

$$T_{new} = T_{avg} + \Sigma_i \beta_i T_i \quad (2)$$

where $S_{new}$ represents a new 3D face shape, $S_{avg}$ represents the average shape, $\alpha_i$ represents a shape coefficient corresponding to $S_i$, $S_i$ represents a PCA shape component, $T_{new}$ represents a new 3D face texture, $T_{avg}$ represents the average texture, $\beta_i$ represents a texture coefficient corresponding to $T_i$, and $T_i$ represents a PCA texture component.

$S_{new}$ and $T_{new}$ may then be combined into one mesh to generate a new 3D model of a face. For example, $S_{new}$ and $T_{new}$ may then be combined by assigning each vertex of $S_{new}$ a color of $T_{new}$ that corresponds to the same vertex.

In some embodiments, shape coefficients, $\alpha_1, \ldots, \alpha_{N=20}$, and texture coefficients, $\beta_1, \ldots, \beta_{N=20}$, of the PCA model are included in the set of parameter values that are to be determined.

FIG. 8A shows an example of reference points obtained from a set of images of a user's face. The reference points define the locations of various facial features and are used to generate a 3D model of the user's face. FIG. 8A shows image 800, where the user is in the front orientation and reference point 802 is at the internal corner of the user's right eye, which is assigned coordinates (x0, y0). Reference points of the eye may also include internal left eye point 804 with coordinates (x1, y1) and external left eye point 806 with coordinates (x2, y2). From the two reference points of internal right eye 802 and internal left eye 804, bridge distance 808 can be determined. In some embodiments, a lens distance can be determined using internal left eye point 804 and external left eye point 806 (resulting in distance 810).

FIG. 8B shows an example of reference points obtained from a set of images of a user's face. FIG. 8B shows another image with another orientation of the user's face, right profile 820, with external right eye reference point 822 with coordinates (y4, z4) and top point where the helix joins the head point 824 with coordinates (y3, z3). From the profile pictures, the z coordinate can be added to the 3D model of the user's face. From the 2D video frames of the user's face, a 3D model of the user's face can be determined.

In some embodiments, reference points from the 2D images (e.g., such as those shown in FIGS. 8A and 8B) are combined to make 3D model of a user's face. The corresponding reference points are combined to make a set of (x, y, z) coordinates representing the position of each of the reference points (e.g., locations of facial features) on the user's face/head. For example, the (x, y) coordinates of the outside corner of the right eye 812 from the front orientation video frame 800 of FIG. 8A can be combined with the z coordinate of the outside right eye reference point 822 in the right orientation image/video frame 820 of FIG. 8B to obtain a reference point with coordinates. A 3D model of a user's face includes 3D points (corresponding (x, y, z) coordinates) including internal eyebrow points, external eye corners, internal eye corners, ear junctures, cheekbones, nose tip, and the like.

FIG. 9 is a diagram showing an example of a visualization of a predetermined 3D face in 3D space. In some embodiments, the predetermined 3D face comprises an .obj file. In the example of FIG. 9, predetermined 3D face 900 includes triangular-shaped polygons that define the shapes of the facial features of the predetermined 3D face. In some embodiments, each polygon includes an associated color representing color of that region of the face. While in the example of FIG. 9, predetermined 3D face 900 includes triangular-shaped polygons, in actual implementation, a predetermined 3D face may include polygons of other shapes and/or other numbers of vertices as well.

Figure 10:
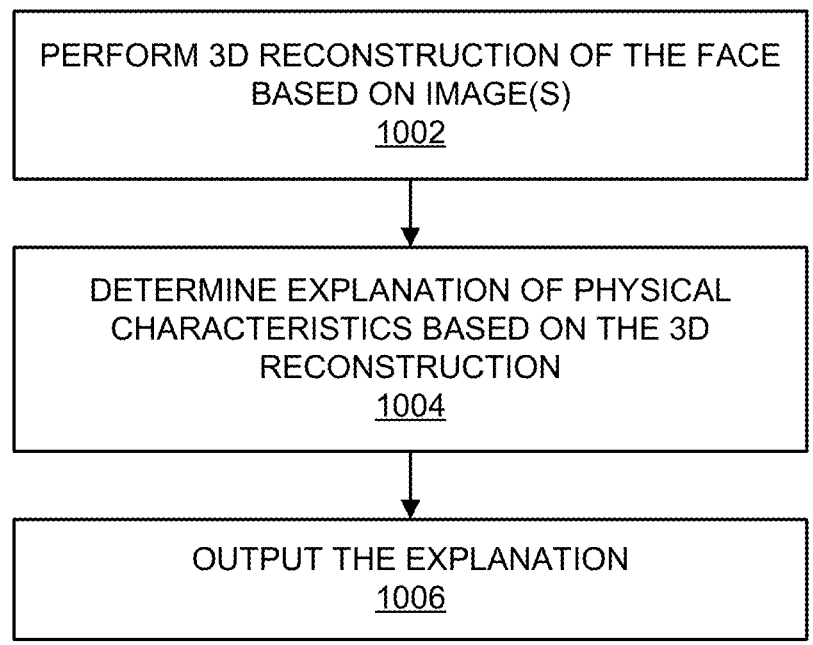
FIG. 10 is a flow chart illustrating an embodiment of a process for determining an explanation for a recommendation.
Figure 16:
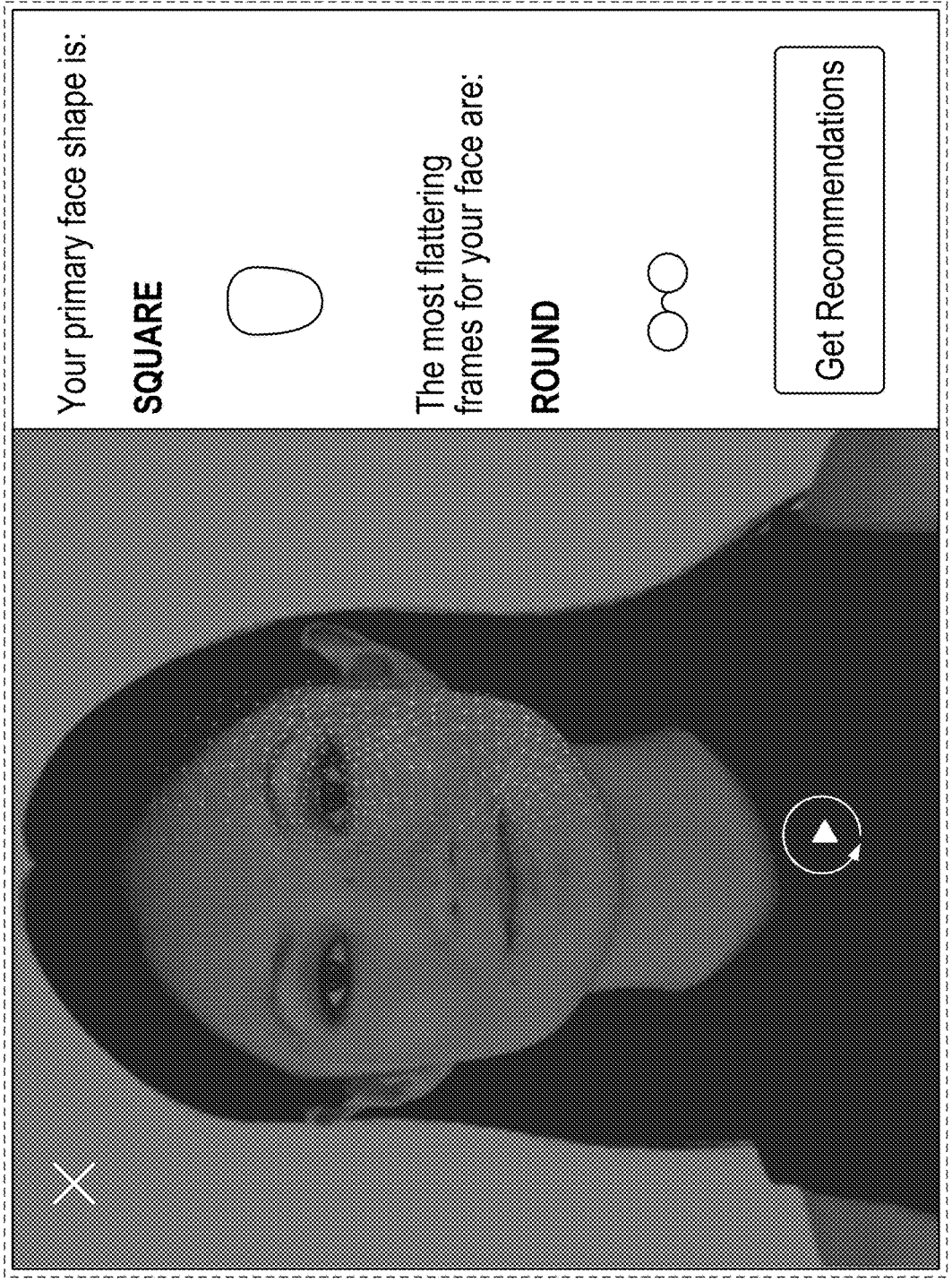
FIG. 16 is an example GUI showing output of a recommendation based on a user's physical features.

FIG. 10 is a flow chart illustrating an embodiment of a process for determining an explanation for a recommendation. Process 1000 may be at least in part implemented on one or more components of system 200 of FIG. 2. In some embodiments, process 200 is performed by recommendation engine 314 and/or output engine 312 of FIG. 3. In some embodiments, at least a portion of the process of FIG. 10 is included in 104 and/or 106 of FIG. 1. An example of an output is shown in FIG. 16.

The process performs 3D reconstruction of the face based on one or more images (1002). 3D reconstruction may be performed according to the methods described herein. For example, a 3D model of the head may be generated from the images. A face pose may be determined from a rotation matrix and translation vector. Pose estimation may be performed for the face based on a 3D model and the camera's intrinsic parameters.

The process determines an explanation of physical characteristics based on the 3D reconstruction (1004). For example, facial features such as face shape, facial structure or proportions, eye color, hair color, skin color and/or texture may be determined. An explanation for picking a glasses frame with a particular nose pad structure may be explained by a facial feature of a bridge being relatively narrow and short. The particular nose-pad structure on a pair of glasses may be well-suited (e.g., a good fit) for that type of nose bridge, providing both comfort and aesthetic fit of centering the eyes within the frame.

The process outputs the explanation (1006). The explanation may be output with the recommendation to provide a user with more context and information about why a recommendation was made. Referring back to the example of a nose-pad being suitable for a relatively narrow and short nose bridge, this physical attribute may be output on a GUI to inform a user that the frame is suitable for the user because of the user's nose bridge structure.

Figure 11:
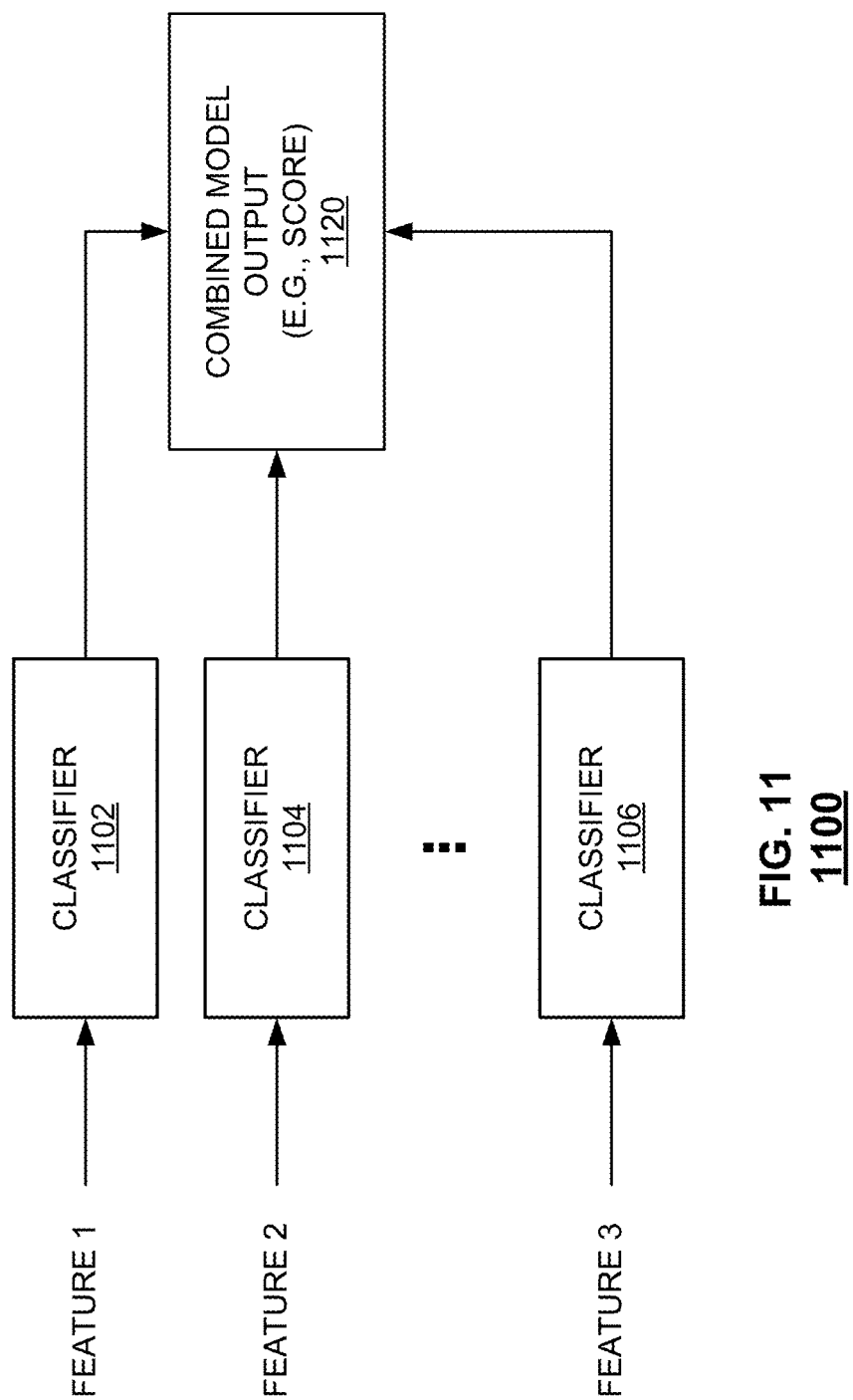
FIG. 11 is a block diagram illustrating an embodiment of a facial data scoring system.

FIG. 11 is a block diagram illustrating an embodiment of a facial data scoring system. In this example, the facial data scoring system 1100 includes classifiers 1102-1106. Each of the classifiers may be configured to output a score based on a received feature. For example, classifier 1102 receives Feature 1 and outputs a score for that feature, classifier 1104 receives Feature 2 and outputs a score for that feature, and classifier 1106 receives Feature 3 and outputs a score for that feature. In various embodiments, the classifier is implemented by a machine learning model such that the scoring improves over time as more training data is input to the classifier.

As shown, a variable number of classifiers may be provided in the system, each adapted to handle a respective feature type. Example feature types include face shape, skin color, eye color, hair color, facial proportions, and the like. In some embodiments, one or more feature types may be determined based on a 3D surface of the face.

Face shape may be detected as follows. A classifier is configured to determine a face shape based on received features. A classifier determines a contour of the face, wherein the contour is a set of points. The contour may be determined using libraries or conventional methods. A classifier is configured to assign scores to each face shape. A vector of scores describes a facial contour. In some embodiments, face shape is described by a degree to which the face falls into a pre-defined category or label such as round, oval, heart, triangle, and square. For example, a face may be 40% square and 60% oval and need not be categorized as 100% oval. The classifier is configured to assign scores by determining a match or similarity between the set of points of the facial contour and a known set of points. If there is a match or similarity within a threshold, this means that the shape is a predefined percentage oval, a predefined percentage square, etc.

In various embodiments, a skin area defines a contour of the face. For example, the skin area is a determination of where hair ends and skin begins, where a background ends and skin begins, and the like.

In some embodiments, the facial features are extracted from the images directly. In some embodiments, the facial features are extracted from a morphable model as further described herein. The detected facial contours may be input into a machine learning model associated with detecting face shape.

Skin pattern is a measure of texture, birth marks, coarseness, and the like of skin. Product recommendations may be adapted to a user's skin pattern. For example unique skin patterns may affect the choice of products to recommend. In various embodiments, skin pattern is determined by sampling pixels from an area representing skin. In some embodiments, a 3D morphable head provides information about skin region and narrows the areas in which pixels are sampled for determining skin pattern. For example, an image is segmented into skin regions and non-skin regions (such as hair, clothing, background, etc.). Skin regions may then be sampled to determine skin pattern.

In various embodiments, a classifier is configured to determine skin color. Skin color describes the color of at least a portion of the user's face. The skin color may be described in various color spaces such as RGB, CIELAB, and the like. Skin color may be determined by sampling colors from various areas of a user's face based at least in part on a set of images of the user's face.

Skin color may be determined while factoring in the lighting environment in which an image was recorded. In various embodiments, for each image of the set of images associated with the user's face, a morphed 3D generic model transformed with the set of extrinsic information associated with that particular image is fitted with a 3D glasses model that is also transformed with the set of extrinsic information associated with that particular image and a shadow casted by the transformed 3D glasses model onto the transformed generic 3D model is simulated with a given lighting model. In some embodiments, the lighting model is determined based on the specific lighting environment of the user in the set of images. For example, the 3D glasses model is associated with a pair of glasses that has been selected to be virtually tried on the user's face. In various embodiments, a 2D face with shadows image that includes the shadows casted by the glasses model onto the transformed 3D generic model is generated. In various embodiments, a corresponding shadow transform is generated for each image of the set of images associated with the user's face based at least in part on a difference between each image's corresponding 2D face image and the corresponding 2D face with shadows image. In various embodiments, a shadow transform corresponding to an image of the set of images associated with the user's face can be applied to that image to render/simulate the shadows casted by the selected glasses onto the user's face in that image. The image of the user's face to which a corresponding shadow transform was applied can be presented with an overlay of a 2D image of the selected pair of glasses so as to simulate a virtual try-on of the selected pair of glasses on the user's face, with realistic shadows casted by the selected glasses onto the user's face as simulated using the lighting model that is determined based on the specific lighting environment of the user.

In some embodiments, the facial features are extracted from the images directly. In some embodiments, the facial features are extracted from a morphable model as further described herein. For example, skin color may be determined from the morphable model based on color of polygons. The sampled colors may be input into a machine learning model associated with determining skin color.

In various embodiments, a classifier is configured to determine eye color. Eye color may be determined by sampling colors from various areas of a user's eye such as the iris based at least in part on a set of images of the user's face. In some embodiments, the facial features are extracted from the images directly. In some embodiments, the facial features are extracted from a morphable model as further described herein. For example, the 3D morphable head may be used to identify location of eyes to narrow the region in which pixels are sampled to determine eye color. The sampled colors may be input into a machine learning model associated with determining eye color.

In various embodiments, a classifier is configured to determine hair color. Hair color may be determined by sampling colors from various areas of a user's hair based at least in part on a set of images of the user's face. In some embodiments, the facial features are extracted from the images directly. In some embodiments, the facial features are extracted from a morphable model as further described herein. The sampled colors may be input into a machine learning model associated with determining hair color.

In various embodiments, a classifier is configured to determine facial structure (sometimes called facial proportions). Facial proportions may be determined by extracting ratios between at least two facial feature distances based at least in part on a set of images of the user's face. For example, the classifier may receive facial width and other measures or ratios of facial features. For example, a ratio of (i) the distance between external eye corners and (ii) the distance between the tip of the nose to the bridge line of the nose, where the bridge line is a line that crosses the nose connecting the internal eye corners.

In some embodiments, the facial features are extracted from the images directly. In some embodiments, the facial features are extracted from a morphable model as further described herein. The sampled colors may be input into a machine learning model associated with determining facial proportions.

In various embodiments, a classifier is configured to determine a 3D surface of the face. The 3D surface of the face is a description of the structure of the face as measured by obtaining locations or vertices from a morphable model of a user's face. Various features may be determined from the 3D model of the face. For example, face shape may be determined by extracting characteristics from the 3D morphable model of the head. For example, bridge area, cheekbones, pantascopic tilt (the angle of the lens to the face), and other characteristics may be determined from the 3D morphable model. The fit of glasses and how the glasses sit on a specific user's face may be assessed based on these factors. A glasses with a poor fit or that might not look good on a user's face may de-prioritized when assembling a list of recommendations or not recommended.

In some embodiments, to train a classifier to identify facial characteristics given a 3D morphable head, coordinates of vertices and colors of the 3D surface of the face may be extracted from the morphable head. The coordinates of the vertices may be polygons forming the morphable head. In some embodiments, the morphable head may comprise a large number coordinates (e.g., on the order of 20,000 points) forming polygons. Each polygon may have an associated color. The coordinates are provided to a data model or classifier, which may be implemented by a machine learning model. The coordinates of vertices and labels of products are provided to the classifier. The labels may be predefined or assigned or automatically determined as a representation of the product. The classifier determines a correlation between the vertices and labels.

In some embodiments, to train a classifier to identify facial characteristics given a 3D morphable head, the 3D morphable head is rendered from several angles. For example, a library of images may be made up of the head rendered from various angles. From the heads rendered at various angles, contours may be detected. A face shape or scoring of face shape may be assigned based on the detected contours.

The 3D surface of the face may be used to determined similarities between faces. For example, two users may share the feature of having relatively widely spaced eyes, indicating that they are both suitable for a particular type of glasses.

The obtained locations or vertices may be input into a machine learning model associated with determining a 3D surface of a face. In some embodiments, a correlation between the shape of glasses and a 3D surface of the face may be determined. The correlation may be used to recommend glasses to the user or other users having similar 3D face surfaces.

In various embodiments, a combined model output is generated from outputs of the classifiers 1102-1106. Outputs corresponding to respective ones of a plurality of trained machine learning models associated with a plurality of facial feature types are combined. The combined output may be correlated with a plurality of products to selects a subset of the plurality of products for further analysis. In one aspect, potential products to be recommended are narrowed down by the correlation process. In some embodiments, additional types of recommendations, collaborative filtering, and the like may be used to determine recommendations. An example of a correlator is shown in FIG. 4. The subset of products may be presented.

FIG. 12 is a flow chart illustrating an embodiment of a process for determining facial feature properties using a classifier. Process 1200 may be at least in part implemented on one or more components of system 200 of FIG. 2. In some embodiments, process 200 is performed by recommendation engine 314 of FIG. 3 and/or classifier 1102-1106 of FIG. 11. In some embodiments, at least a portion of the process of FIG. 12 is included in 104 of FIG. 1.

The process extracts facial features corresponding to a type of facial features based on the received image(s) (1202). Facial feature extraction may be based on images and/or other sensor data such as depth. In various embodiments, facial feature extraction may be performed for several types of facial features. For example, 704 may be repeated for each facial feature until no unprocessed facial features remain.

The process inputs the extracted facial features to a classifier corresponding to the type of facial feature (1204). The classifier may be implemented by a trained machine learning model. For example, facial features associated with face shape is input to a face shape classifier. The face shape may be systematically determined by a classifier that has been trained with face shape data and can automatically detect face shape based on input data.

The process obtains an output from the classifier corresponding to the type of facial feature (1206). Referring again to the face shape example, the classifier outputs a percentage by which an input face falls into various shape categories (round, oval, square, diamond, etc.).

Although chiefly described using the example of glasses, the techniques described herein find application in a variety of settings including virtual fitting of earrings, hats, makeup, shoes, clothing, and the like.

FIG. 13A is an example GUI of a product catalog for browsing an inventory. GUI 1300 includes an optional navigational area 1302, which can be populated with menus, filters, and the like to assist navigation of an inventory displayed in the GUI. In this example, GUI 1300 displays a product catalog including a number of glasses frames. Here, six glasses frames (Models AA, AB, AC, BE, BX, and CD) are visible. A user can interact with GUI 1300 to explore products and details. For example, additional glasses may be revealed in GUI 1300 in response to scrolling down the page via using scroll bar 1304. One or more additional glasses frames may be loaded in response to a user scrolling down the page. In various embodiments, the glasses frames that are loaded in response to a user scrolling down the page may be determined based at least in part on the techniques described herein. For example, glasses recommendations may be adapted to customer preferences, at least some of which may be learned based on the customer browsing habits.

FIG. 13B is an example GUI showing products displayed in response to user interaction with the GUI of FIG. 13A. The group 1330 of six glasses frames (Models DA, DB, DR, EA, EF, and EL) may be displayed when a user scrolls down such as by using scrollbar 1304 of GUI 1300. The group 1330 may include one or more recommended products selected based at least in part on the techniques described herein such as products selected by recommendation engine 314 of FIG. 3. In some embodiments, the group 1330 is pre-loaded (e.g., stored in a buffer) to facilitate quick loading of the products in anticipation of a user scrolling down GUI 1300.

FIG. 13C is an example GUI showing products displayed in response to user interaction with the GUI of FIG. 13A. The group 1350 of six glasses frames (Models AD, AG, AL, RV, RM, and RP) may be displayed when a user scrolls down such as by using scrollbar 1304 of GUI 1300. In some embodiments, the group 1350 is pre-loaded (e.g., stored in a buffer) to facilitate quick loading of the products in anticipation of a user scrolling down GUI 1300.

The group 1350 may include one or more recommended products selected based at least in part on the techniques described herein such as products selected by recommendation engine 314 of FIG. 3. In this example, group 1350 includes recommendations made in response to user selection of Model AC (shown in GUI 1300). For example, a user may click on Model AC to load a product page associated with that model and return back to the catalog page 1300. When the user returns to catalog page 1300, group 1350 may be loaded so that when the user scrolls down GUI 1300, group 1350 is displayed. The products in group 1350 may be selected based on Model AC according to the techniques described herein. For example, group 1350 includes rectangular framed glasses similar to Model AC. In one aspect, the composition of group 1330 and 1350 provides a seamless user experience because the user is unaware of products being resorted or updated in response to browsing. As the user scrolls down a web page, the hidden products (e.g., those lower down in the list of products) can be updated in response to user browsing to dynamically adapt to user preferences.

Figure 14A:
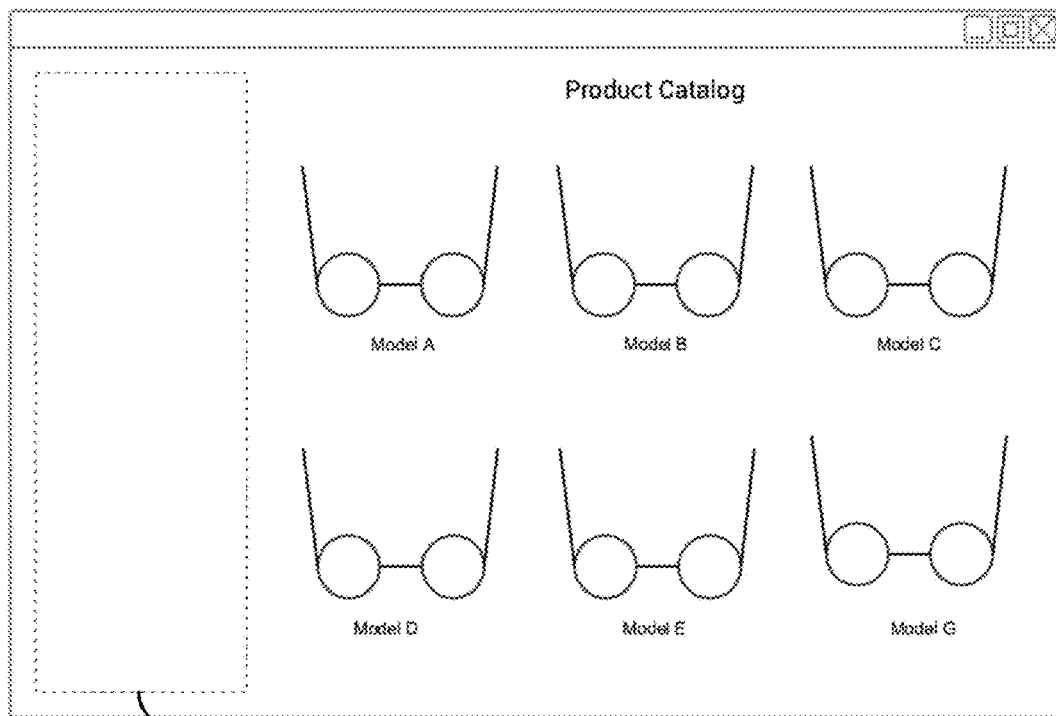
FIG. 14A is an example GUI of a product catalog for browsing an inventory.

FIG. 14A is an example GUI of a product catalog for browsing an inventory. GUI 1400 includes an optional navigational area 1402, which can be populated with menus, filters, and the like to assist navigation of an inventory displayed in the GUI. In this example, GUI 1400 displays a product catalog including a number of glasses frames. Here, six glasses frames (Models A, B, C, D, E, and G) are shown. A user can interact with GUI 1400 to explore products and details. For example, in response to user selection of Model C, the products displayed in GUI 1400 may be updated.

Figure 14B:
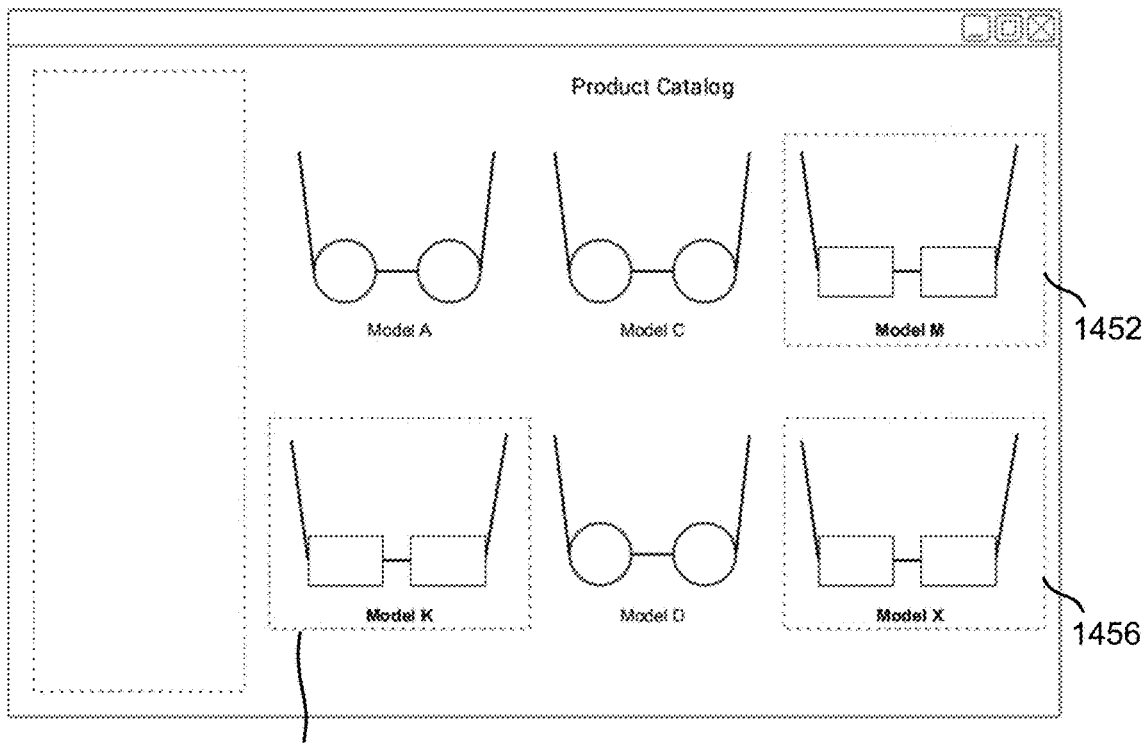
FIG. 14B is an example GUI displayed in response to user interaction with the GUI of FIG. 14A.

FIG. 14B is an example GUI displayed in response to user interaction with the GUI of FIG. 14A. For example, a user may click on Model C (shown in GUI 1400) to load a product page associated with that model and return back to the catalog page. When the user returns to catalog page, GUI 1450 may be loaded to display updated product recommendations. Here, Models M, K, and X replace Models C, D, and G of GUI 1400 in response to user selection of Model C. Models M, K, and X may be selected based on Model C according to the techniques described herein. For example, Model C is a wire frame. Models M, K, and X are wire frame glasses that replace plastic frame glasses Models C, D, and G. In various embodiments, some of the regions of GUI 1450 are designated for receiving replacement or updated product recommendations. These regions are sometimes called "recommendation blocks" herein. For example, recommendation blocks 1452, 1454, and 1456 are used for updates, while products shown in other regions (such as Model D) remain. In some embodiments, regions that are more visible are selected to receive product recommendation updates. In other words, product recommendations may be interspersed among those products displayed in a GUI and updated dynamically in response to customer preferences.

Figure 15A:
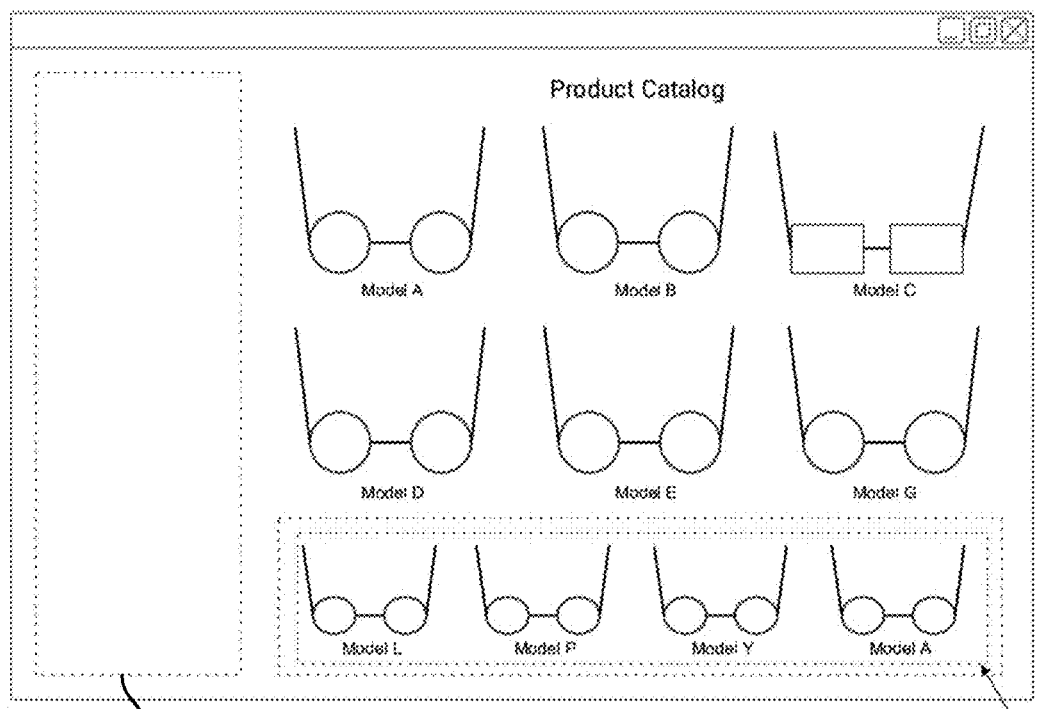
FIG. 15A is an example GUI of a product catalog for browsing an inventory.

FIG. 15A is an example GUI of a product catalog for browsing an inventory. GUI 1500 includes an optional navigational area 1502, which can be populated with menus, filters, and the like to assist navigation of an inventory displayed in the GUI. GUI 1500 includes a recommendations block 1504 in which recommended products (here, four glasses models) are displayed. In this example, GUI 1500 displays a product catalog including a number of glasses frames. Here, six glasses frames (Models A, B, C, D, E, and G) are shown. In addition, four glasses frames (Models L, P, Y, and A) are shown in recommendations block 1504.

The recommendations block can be updated to display other recommended products adapted to a user's preferences. For example, in response to user selection of Model C, the products displayed in recommendations block 1504 may be updated.

Figure 15B:
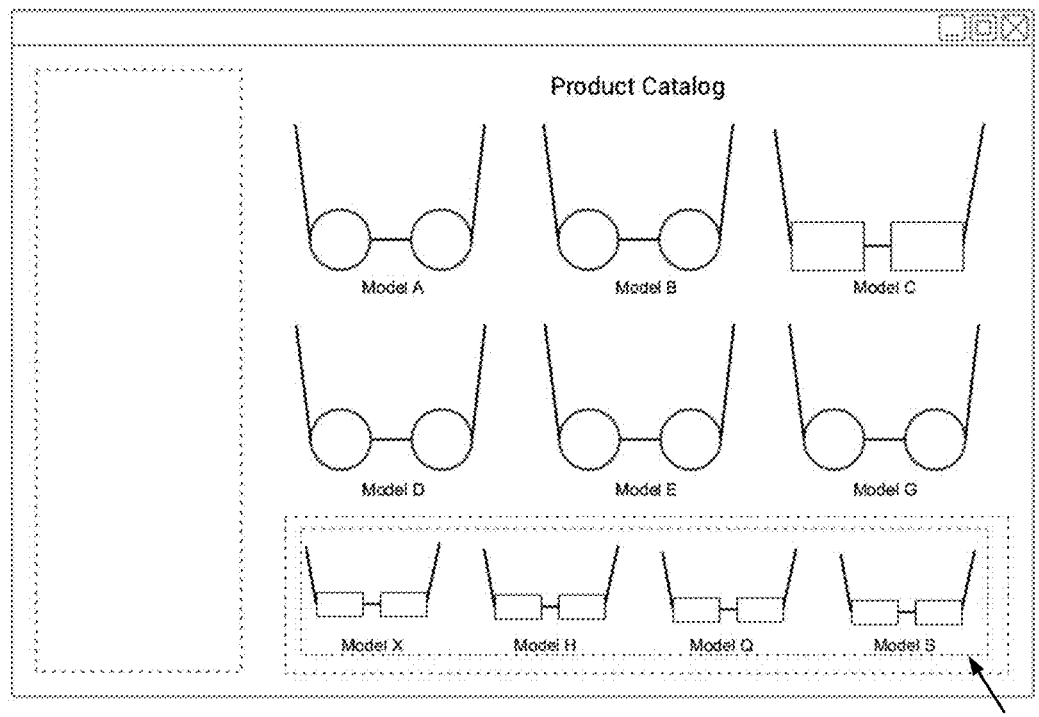
FIG. 15B is an example GUI displayed in response to user interaction with the GUI of FIG. 15A.

FIG. 15B is an example GUI displayed in response to user interaction with the GUI of FIG. 15A. For example, a user may click on Model C (shown in GUI 1500) to load a product page associated with that model and return back to the catalog page. When the user returns to catalog page, GUI 1550 may be loaded to display updated product recommendations in recommendations block 1504. Here, Models L, P, Y, and A of GUI 1500 are replaced by Models X, H, Q, and S shown in GUI 1550 in response to user selection of Model C. Models X, H, Q, and S may be selected based on Model C according to the techniques described herein. For example, Model C is a rectangular frame. Models X, H, Q, and S are rectangular frame glasses that may be of interest to a user interested in Model C.

FIG. 16 is an example GUI showing output of a recommendation based on a user's physical features. GUI 1600 shows a captured image of a user's face and a recommendation. Here, the recommendation is round frames. An explanation for this recommendation is displayed. Here, the reason for recommend round frames is that the user's primary face shape is square. That is, the user's face may be displayed by a variety of shapes, and the dominant shape is square. A square face is most flattered by round glasses frames in this example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor; and
 a memory coupled with the processor, wherein the memory is configured to provide the processor with instructions which when executed cause the processor to:
  generate a three-dimensional (3D) model of a head of a user based on an image of the user, including generating a set of parameter values to a statistical model that corresponds to the image of the user by evaluating candidate parameter values using a cost function determined based at least in part on optical flow;
  extract a ratio between a plurality of facial feature distances to determine a facial proportion of the user;
  determine a physical characteristic of the user based at least in part on the image of the user, wherein the physical characteristic is determined at least in part by extracting a parameter from the 3D model, wherein the physical characteristic comprises the facial proportion;
  determine a correlation between the physical characteristic and a product, wherein the correlation is performed using a 3D model of a user's face and a 3D model of the product; and
  generate a product recommendation based at least in part on the determined correlation, the product recommendation including a recommendation explanation.

2. The system of claim 1, wherein the determination of the physical characteristic includes a fit of the product to the user.

3. The system of claim 1, wherein the physical characteristic includes a face shape, the shape being defined with respect to a degree to which the shape falls into a plurality of categories.

4. The system of claim 1, wherein the physical characteristic includes a plurality of facial proportions.

5. The system of claim 1, wherein the physical characteristic includes at least one of eye color, skin color, and hair color, the color being normalized based at least in part on a lighting environment in which the at least one image is captured.

6. The system of claim 1, wherein the determination of the correlation is based on a weighted combination of at least one of: the physical characteristic, user browsing data, and user profile data.

7. The system of claim 6, wherein weights assigned to the at least one of: the physical characteristic, user browsing data, and user profile data is based on an output from a machine learning model.

8. The system of claim 6, wherein the physical characteristic is more heavily weighted than at least one of: user browsing data and user profile data.

9. The system of claim 6, wherein weights assigned to the physical characteristic, the user browsing data, and the user profile data are adjustable.

10. The system of claim 6, wherein the processor is further configured to adjust weights used for the weighted combination in response to user feedback on the product recommendation.

11. The system of claim 1, wherein the statistical model is derived from Principal Component Analysis based at least in part on 3D scans of the user's face, and the statistical model includes shape components and texture components.

12. The system of claim 1, wherein the 3D model is a mesh model including polygons defining at least one of: shape of facial features and head shape.

13. The system of claim 1, wherein the determination of a physical characteristic includes determining a skin color based on a color of a polygon of the 3D model.

14. The system of claim 1, wherein the generation of a product recommendation is based on attributes of a product and the attributes of the product are determined based at least in part on a 3D model of the product.

15. The system of claim 1, wherein the generation of a product recommendation is based on fit of the 3D model of the product to a 3D model of the user.

16. The system of claim 1, wherein:
the product recommendation includes a group of products; and
the processor is further configured to update the product recommendation responsive to user selection of at least one product in the group.

17. The system of claim 1, wherein the product recommendation includes an explanation for the product recommendation.

18. A method comprising:
generating, using a processor, a three-dimensional (3D) model of a head of a user based on an image of the user, including generating a set of parameter values to a statistical model that corresponds to the image of the user by evaluating candidate parameter values using a cost function determined based at least in part on optical flow;
extracting, using the processor, a ratio between a plurality of facial feature distances to determine a facial proportion of the user;
extracting, using the processor, a physical characteristic of the user based at least in part on the image of the user, wherein the physical characteristic is determined at least in part by extracting a parameter from the 3D model, wherein the physical characteristic comprises the facial proportion;
determining, using the processor, a correlation between the physical characteristic and a product, wherein the correlation is performed using a 3D model of a user's face and a 3D model of the product; and
generating, using the processor, a product recommendation based at least in part on the determined correlation, the product recommendation including a recommendation explanation.

19. A computer program product embodied in a non-transitory computer readable storage medium and comprising computer instructions for:
generating a three-dimensional (3D) model of a head of a user based on an image of the user, including generating a set of parameter values to a statistical model that corresponds to the image of the user by evaluating candidate parameter values using a cost function determined based at least in part on optical flow;
extracting a ratio between a plurality of facial feature distances to determine a facial proportion of the user;
extracting a physical characteristic of the user based at least in part on the image of the user, wherein the physical characteristic is determined at least in part by extracting a parameter from the 3D model, wherein the physical characteristic comprises the facial proportion;
determining a correlation between the physical characteristic and a product, comprising constructing and training a data model to determine a correlation between a user's face and the product or a purchase, wherein the correlation is performed using a 3D model of the user's face and a 3D model of the product; and
generating a product recommendation based at least m part on the determined correlation.

* * * * *